United States Patent Office 3,504,324
Patented Mar. 31, 1970

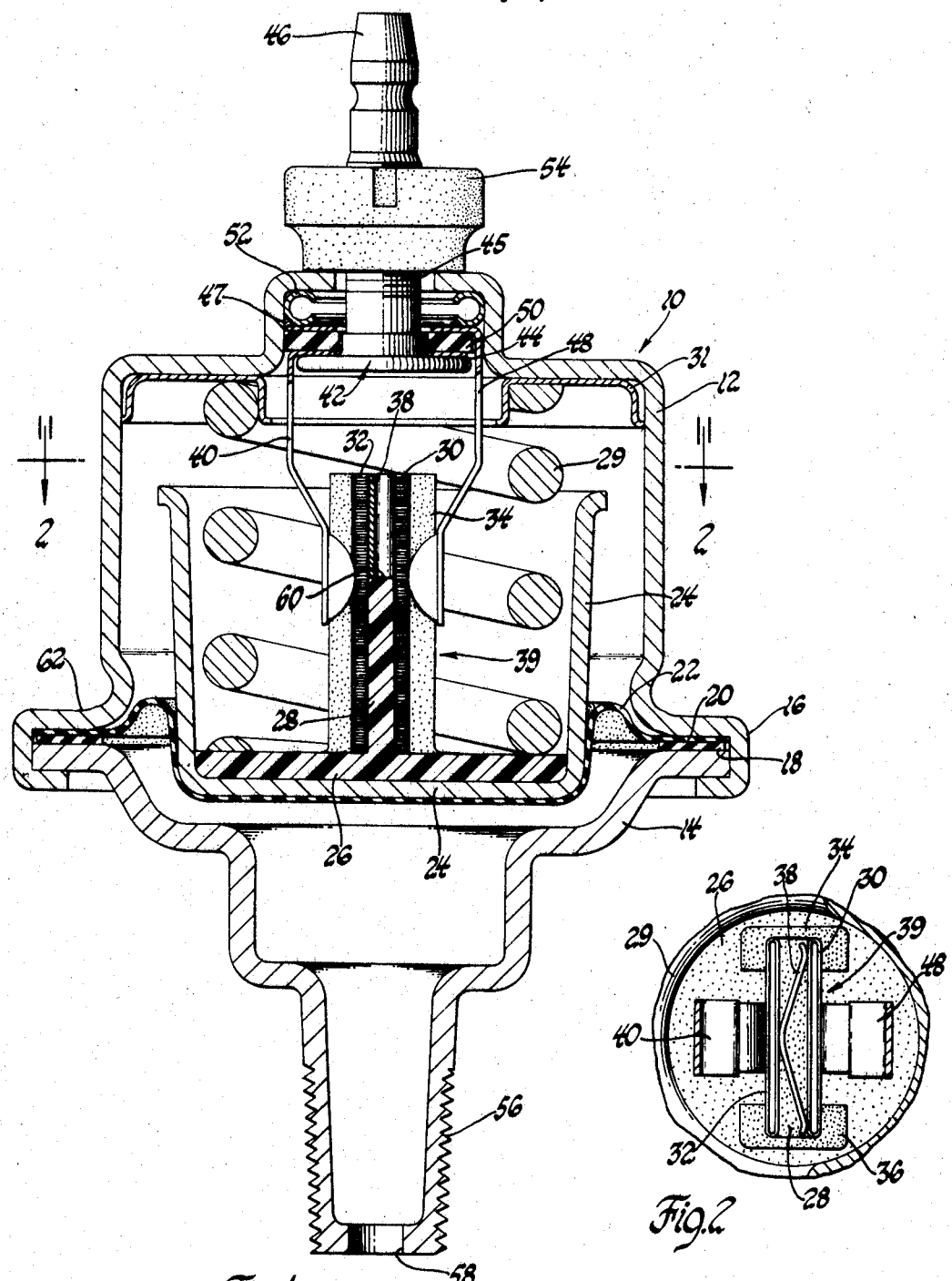

3,504,324
PRESSURE TRANSDUCER
John E. Creager, Fenton, Mich., assignor to General Motors Corporation, Detroit, Mich., a corporation of Delaware
Filed May 6, 1968, Ser. No. 726,990
Int. Cl. G01l 9/02
U.S. Cl. 338—42                               6 Claims

ABSTRACT OF THE DISCLOSURE

The invention relates to a pressure transducer of the wire resistor type, wherein the relative movement of contacts on two resistive members indicates the sum of the resistance between the contact tips with a minimum travel of the contacts and includes a means of calibration.

---

The invention generally relates to pressure devices and, more specifically, to a device activated by pressure against a diaphragm and spring, thereby causing a resistor to move and indicate pressure as a function of resistance.

U.S. Patent 2,911,606 to Hoffman is considered relevant prior art. The present invention is an improvement over the patent to Hoffman in that it is a simple, compact device having a minimum number of moving parts and, further, having a novel resistor, contact arm arrangement and novel means of calibration.

It is an object of the present invention to provide a pressure transducer which is compact, has the minimum of moving parts and which is easy to adjust and calibrate.

Another object of the present invention is to provide a pressure transducer which incorporates a novel resistor and wiper arm arrangement and means of calibration.

A further object of the invention is to provide a pressure transducer wherein the resistor and wiper arm cooperate to provide a reading in a minimum distance of travel of the resistor.

These and other features of the invention will be readily apparent from the following specification and drawings wherein:

FIGURE 1 is a sectional view of the transducer;
FIGURE 2 is a sectional view taken along the line 2—2 of FIGURE 1 and shows the construction of the resistor.

As shown in FIGURE 1, the novel transducer includes a housing 10 made up of a pair of rigid shell-like members 12 and 14 being generally bell shaped in configuration, but which may be round, square or any similar shape convenient for manufacture. These members may be made from sheet metal, plastic or the like. Member 12, designated as the upper member, is attached to lower member 14 by any suitable means, such as a U-shaped portion 16 integral with member 12 and located at the open end thereof. It is understood that any convenient means such as rivets, welding or the like may be used for attaching the upper member and the lower member. Disposed between and held in place by members 12 and 14 is a seal 18 made of any suitable material, and a diaphragm 20.

Diaphragm 20 is made of a Dacron fabric, or similar material commonly known and used, having a rubber coating on both sides thereof. The coating may be of the chemically treated silicone rubber type, commonly used in similar devices, which provides greater protection for the diaphragm. Diaphragm 20 has a fold 22, which fold will roll along the inner surface of upper member 12 during operation. This rolling action of the diaphragm allows the assembly to move upwardly through the distance necessary to indicate the pressures desired.

Attached to the upper portion of diaphragm 20, by some suitable means such as an adhesive or the like and disposed within upper member 12, is a cup-shaped member 24 having an insulating member 26 disposed at the bottom thereof, which member may be made from plastic or the like and generally covers the bottom of the cup to give maximum support to spring 29. Member 26 is rigid and has an integral upstanding portion 28. Cup 24 is biased in the extreme downward position against diaphragm 20 by a coil spring 29. Spring 29 is positioned within member 12 and cup 24 by the clip-type member 31, located at the upper portion of member 12. Mounted on upstanding insulator member 28 are two separate resistor cards 30, 32 with the resistor cards held in place thereon by the U-shaped insulator members 34, 36 which may be plastic clips or the like and conductive separator or tensioning member 38. As shown, members 34, 36 are positioned at the ends of the resistor cards, with the resistor cards held within members 34, 36 and against member 28 by member 38, which is generally made in the form of a spring clip. It is understood that the resistor cards may be secured to member 28 by glueing, riveting or the like. It is further understood that resistor 39, which is generally constructed of members 28, 30, 32, 34, 36 and 38 may be of any suitable shape or configuration. Member 38 is electrically conductive and serves to electrically connect resistor cards 30 and 32. The bottom edge of member 38 serves to define the zero point of the resistor 39, this being the point of interconnection between resistor cards 30 and 32.

A first contact 40 is mounted on, and held against resistor card 32 by, terminal 42. Terminal 42 has a head 44 at one end and an electrical connector 46 at the opposite end, with the head and part of the terminal body 45 disposed within a cavity 47 formed in upper member 12. To make the unit more compact, the cavity, as shown in FIGURE 1, may be eliminated. A portion of body 45 and connector 46 projects from cavity 47 with terminal 42 being movable in a direction transverse to the diaphragm within the upper member. A second contact 48 is also mounted on and is held against resistor card 30 by terminal 42, with contact 48 being electrically insulated from contact 40 by suitable insulating means 50. A crush-type compressible washer 52 is also mounted on terminal 42 and in electrical contact with contact 48, upper member 12 and electrical connector 46, which washer aids in calibration of the device. A coil spring or similar compressible device may be used in place of the crush washer. An insulated terminal nut 54, generally made of plastic, is screwed to the terminal 42 and rests on the outside portion of upper member 12 to hold the contact assembly on the terminal in fixed relation with resistor cards 30, 32.

Lower member 14 has a threaded end 56 which is adapted to be screwed into any available aperture in a tank, crankcase or housing wherein pressure changes occur, with the threaded end 56 having a central bore or aperture 58 to admit fluid to the lower member 14, which fluid acts on diaphragm 20.

The transducer is calibrated to the zero value and also the maximum value. Because of the manner in which the transducer is calibrated, tolerances of the spring, cup and resistor cards can be large. In calibrating to zero a slight pressure is used to take the slack out of the diaphragm 20, and terminal nut 54 is tightened to crush washer 52, thereby raising contacts 40, 48 to the zero point 60. This adjustment, once made, will not change. To calibrate for the high value, high pressure is used; and, because of the construction of the device, this pressure should be higher than the maximum pressure readable on the gage. To arrive at the proper maximum reading, the upper member 12 is distorted as at 62 by rolling in the housing, for example, on a lathe using a suitable tool. This adjustment rolls the portion 62 of the housing against the diaphragm and reduces the effective area of the diaphragm on which the pressure acts. With less effective pressure being exerted on the diaphragm, spring 29 therefore extends further to the relaxed position, thereby pushing the diaphragm, cup and resistor cards downward, thereby positioning the fixed contacts closer toward the zero point and, as is readily apparent, will effectively lower the reading that would be transmitted to a cooperating gage.

In operation the device is screwed into a crank case, for example, where it is desirable to detect the changes in the oil pressure. Oil which is under pressure flows into the bottom portion 14 through bore 58, forcing the diaphragm upwardly, wherein the resistor cards move along contacts 40, 48. As shown in FIGURE 1 the contacts are in the minimum resistance position or at the zero point 60, and, upon application of pressure and upward movement of the resistor 39, the resistance measured is the sum of both the resistor cards. Spring member 38 serves as the electrical contact between resistor cards 30, 32 and contacts 40, 48, wherein the resistance measured is the resistance from the zero point 60 of the resistor card to the contact 48, across spring 38 to resistor card 30, through card 30 and contact 40. The electrical ground connections are made through the housing 10. The electrical path through the transducer would be from the housing through washer 52, through contact 48, up resistor card 30, through spring 38, down resistor card 32, through contact 40, through terminal 42 to a gage which records pressure change. The total resistance measured is the sum of the resistance between the contact tips and the spring 38. This arrangement provides the required resistance with the shortest travel of the resistor. Because the resistor cards above the zero point are shorted by the spring clip, the gage which cooperates with the transducer will remain at zero and will not indicate a negative reading when pressure is zero.

As shown and as described, the device is simple, compact in configuration, easily assembled and calibrated.

I claim:
1. A pressure transducer comprising:
    a pair of shell-like members connected at their open ends forming a housing;
    a diaphragm held in position at the open ends of said members and disposed between said members thereby dividing said housing into an upper and lower section;
    a resistor mounted on said diaphragm in the upper section of said housing;
    said resistor having two separate resistor cards with electrically conductive means therebetween providing electrical contact between said resistor cards;
    an electrical terminal in said upper section;
    contact means on said electrical terminal and in contact with said resistor cards;
    means providing a passage to the lower section of said housing to admit fluid into said lower section whereby said resistor is moved by said diaphragm across said contact means in relation to the fluid pressure applied to indicate fluid pressure; and
    a compressible bias means to bias said diaphragm toward said lower member, and in opposition to the fluid pressure applied.
2. A pressure transducer comprising:
    a pair of shell-like members connected at their open ends forming a housing;
    a diaphragm held in position at the open ends of said shell-like members and disposed therebetween, dividing said housing into an upper and lower section;
    a resistor vertically mounted on said diaphragm in the upper section of said housing;
    said resistor being made of two separate resistor cards mounted on said diaphragm;
    electrical conductor means providing a contact between said two resistor cards at a point spaced apart from said diaphragm;
    a terminal having first and second contact means mounted thereon, wherein said first and second contacts are each held against a separate resistor card;
    means providing a passage to the lower sections of said hollow housing to admit fluid into said lower section whereby said diaphragm moves said resistor cards along said contacts in relation to fluid pressure applied to indicate the fluid pressure applied, as a function of resistance; and
    a compressible bias means to bias said diaphragm toward said lower member, and in opposition to the fluid pressure applied.
3. A pressure transducer as in claim 2 having means on the exterior of said housing and compressible means on the interior of said housing, both cooperating with said electrical terminal to provide a zero calibration by enabling change of position of the contacts on the resistor cards.
4. A pressure transducer as in claim 3 wherein said electrical terminal having contacts thereon is moved axially away from said diaphragm by the means on the exterior of said housing and the compressible means on the interior of said housing to thereby change the position of the contacts on the resistor cards.
5. A pressure transducer as in claim 2 wherein said separate resistor cards are mounted on an upstanding insulator portion by insulated clip means mounted along the edges, and said conductive separator means, with said upstanding insulator portion being located between and along a portion of said resistor cards at the lower end thereof, and said conductive separator located between and along the remaining portion of said resistor cards at the upper end thereof to bias said resistor cards against said upstanding insulator portions, and said insulated clip means, and to serve as a conductive path between said resistor cards.
6. The method of calibrating a pressure transducer having a pair of shell-like members forming a housing, a diaphragm disposed between said members thereby dividing said housing into an upper and lower section, a compressible member effective to set the zero position in said housing, and contact means, where the steps comprise:
    applying a slight pressure on said diaphragm to take the slack out of said diaphragm;
    changing the position of the contact means by compressing said compressible member to move said contacts to indicate a zero value of pressure; and
    rolling in that portion of said upper section of said housing adjacent the diaphragm to change the effective area of the diaphragm upon which pressure is applied, to an extent sufficient to indicate the maximum pressure reading when actual pressure exceeds the maximum value.

References Cited

UNITED STATES PATENTS

| | | | |
|---|---|---|---|
| 1,953,819 | 4/1934 | Payne | 338—42 X |
| 2,911,606 | 11/1959 | Hoffman | 338—42 |
| 3,200,787 | 8/1965 | Darnell | 73—406 X |
| 3,271,720 | 9/1966 | Hluchan et al. | 338—42 |

RODNEY D. BENNETT, JR., Primary Examiner

H. C. WAMSLEY, Assistant Examiner

U.S. Cl. X.R.

73—4, 398, 406